US012480363B2

(12) United States Patent
Schultz et al.

(10) Patent No.: US 12,480,363 B2
(45) **Date of Patent: *Nov. 25, 2025**

(54) ROTATIONAL SPEED REDUCTION IN DOWNHOLE TOOL ASSEMBLIES

(71) Applicant: THRU TUBING SOLUTIONS, INC., Newcastle, OK (US)

(72) Inventors: Roger L. Schultz, Newcastle, OK (US); Brock W. Watson, Sadler, TX (US); Brett Fears, Mustang, OK (US)

(73) Assignee: THRU TUBING SOLUTIONS, INC., Newcastle, OK (US)

( * ) Notice: Subject to any disclaimer, the term of this patent is extended or adjusted under 35 U.S.C. 154(b) by 134 days.

This patent is subject to a terminal disclaimer.

(21) Appl. No.: 18/062,847

(22) Filed: Dec. 7, 2022

(65) Prior Publication Data

US 2023/0101951 A1 Mar. 30, 2023

Related U.S. Application Data

(62) Division of application No. 16/409,192, filed on May 10, 2019, now Pat. No. 11,560,756.

(30) Foreign Application Priority Data

May 11, 2018 (WO) ................ PCT/US2018/032414

(51) Int. Cl.
*E21B 4/02* (2006.01)
*E21B 4/00* (2006.01)
(Continued)

(52) U.S. Cl.
CPC ................ *E21B 4/02* (2013.01); *E21B 4/006* (2013.01); *E21B 4/16* (2013.01); *F16H 1/32* (2013.01); *E21B 37/00* (2013.01)

(58) Field of Classification Search
CPC ... E21B 4/00; E21B 4/02; E21B 4/006; E21B 4/16; E21B 37/00; F16H 1/32
See application file for complete search history.

(56) References Cited

U.S. PATENT DOCUMENTS

| | | | | |
|---|---|---|---|---|
| 4,049,066 A | | 9/1977 | Richey | |
| 4,170,441 A | * | 10/1979 | Trzeciak ............. | F04C 15/0076 475/159 |

(Continued)

FOREIGN PATENT DOCUMENTS

WO 2007064591 A2 6/2007

OTHER PUBLICATIONS

International Search Report with Written Opinion issued Feb. 25, 2019 for PCT Patent Application No. PCT/US2018/032434, 23 pages.

(Continued)

*Primary Examiner* — Yanick A Akaragwe
(74) *Attorney, Agent, or Firm* — Smith IP Services, P.C.

(57) ABSTRACT

A rotary actuator assembly can include a fluid motor with a rotor that displaces with hypocyclic precessional motion within a stator in response to fluid flow through the fluid motor, and a gear reducer section including an input gear that is fixed relative to the rotor and displaces with the hypocyclic precessional motion relative to an output gear. Another rotary actuator assembly can include a fluid motor with a rotor having a central longitudinal axis that rotates about a central longitudinal axis of a stator, and a gear reducer section including an input gear that rotates with the rotor and displaces relative to an output gear, and the input gear having the same central longitudinal axis as the rotor. A well system can include at least two fluid motors, and fluid flow through one fluid motor causes rotation of the other fluid motor in the well.

12 Claims, 13 Drawing Sheets

(51) Int. Cl.

| | |
|---|---|
| ***E21B 4/16*** | (2006.01) |
| ***E21B 37/00*** | (2006.01) |
| ***F16H 1/32*** | (2006.01) |

(56) References Cited

U.S. PATENT DOCUMENTS

| | | | | |
|---|---|---|---|---|
| 5,484,016 | A | 1/1996 | Surjaatmadja et al. | |
| 6,173,794 | B1 | 1/2001 | Von Gynz-Rekowski | |
| 6,273,189 | B1 | 8/2001 | Gissler et al. | |
| 6,336,502 | B1 | 1/2002 | Surjaatmadja et al. | |
| 6,520,271 | B1 | 2/2003 | Martini | |
| 2006/0237234 | A1 * | 10/2006 | Dennis | E21B 4/16 175/406 |
| 2008/0185186 | A1 * | 8/2008 | Clark | F04C 11/001 175/324 |
| 2010/0200236 | A1 | 8/2010 | Warren et al. | |
| 2015/0144329 | A1 | 5/2015 | Schultz et al. | |
| 2018/0128052 | A1 * | 5/2018 | Herbig | E21B 4/16 |

OTHER PUBLICATIONS

International Search Report with Written Opinion issued Feb. 25, 2019 for PCT Patent Application No. PCT/US2018/032414, 22 pages.

Thru Tubing Solutions; “Titan Motor”, Miling and Cleanout Services, web article via www.thrutubing.com, dated 2015, 6 pages.

Thru Tubing Solutions; “XRV G3”, Premium Downhole Equipment, web article via www.thrutubing.com, dated 2015, 2 pages.

Office Action issued Nov. 20, 2020 for U.S. Appl. No. 16/409,217, 14 pages.

Office Action issued Mar. 15, 2021 for U.S. Appl. No. 16/409,217, 15 pages.

Canadian Examination Report issued Oct. 8, 2021 for CA Patent Application No. 3,070,355, 7 pages.

Office Action issued Aug. 18, 2021 for U.S. Appl. No. 16/409,217, 13 pages.

* cited by examiner

ROTATIONAL SPEED REDUCTION IN DOWNHOLE TOOL ASSEMBLIES

CROSS-REFERENCE TO RELATED APPLICATIONS

This application is a division of prior U.S. application Ser. No. 16/409,192 filed 10 May 2019 and claims the benefit under 35 USC § 119 of the filing date of International Application serial no. PCT/US18/32414 filed 11 May 2018. The entire disclosures of these prior applications are incorporated herein by this reference.

BACKGROUND

This disclosure relates generally to well tools and operations utilizing well tools in subterranean wells and, in at least one example described below, more particularly provides for rotational speed reduction in downhole tool assemblies.

It is desirable in many different situations to produce rotation of one or more well tools downhole. A fluid motor, electrical motor or another type of motor can be used for this purpose. However, a rotational speed output by the motor may not be optimal for operation of the well tool(s) downhole.

Therefore, it will be appreciated that improvements in the arts of designing, constructing and utilizing equipment to produce rotation of well tools downhole are continually needed. Such improvements may be useful with any of a wide variety of different well tools and in a variety of different operations performed in wells.

DETAILED DESCRIPTION

Figure 1:
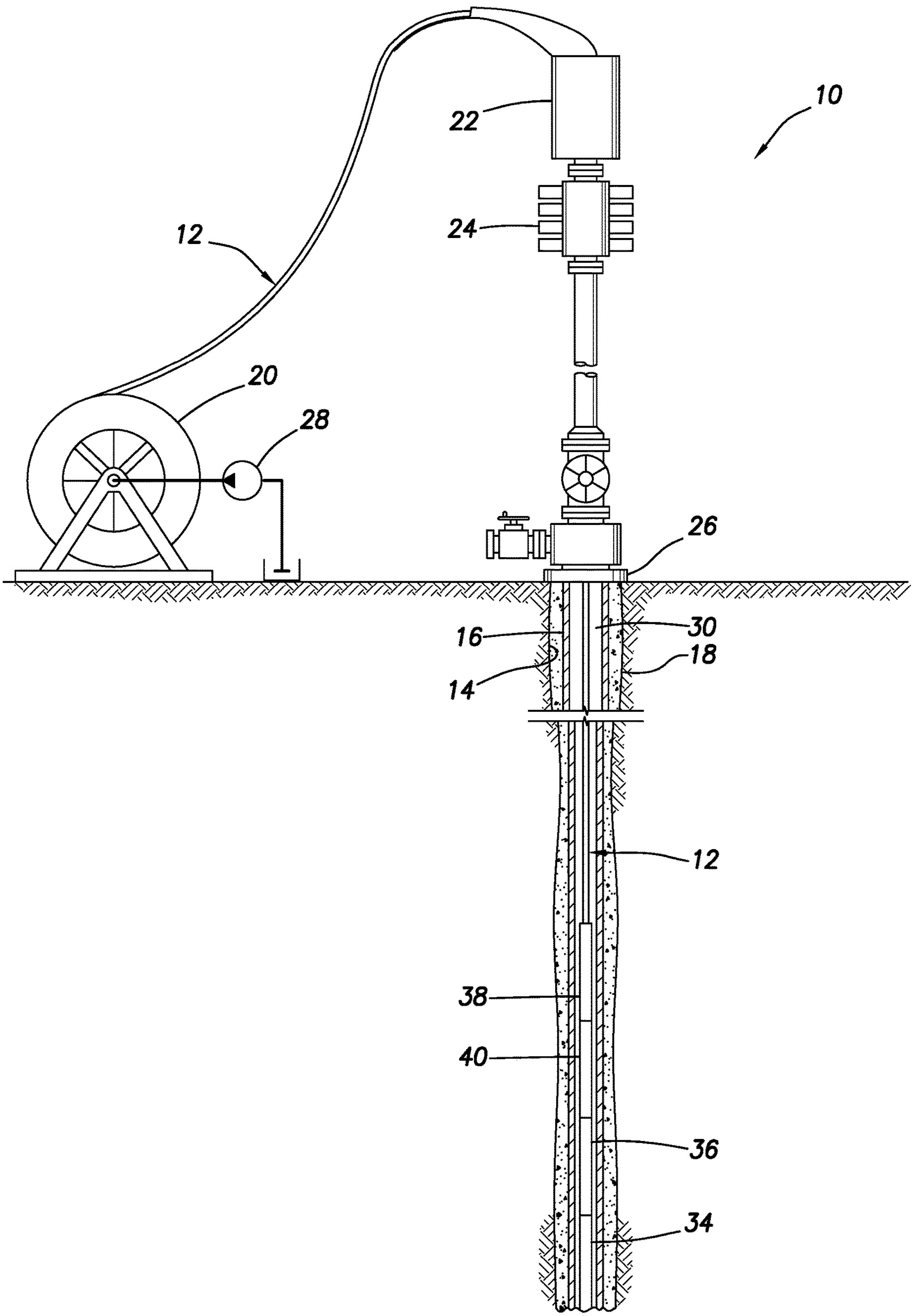
FIG. 1 is a representative partially cross-sectional view of an example of a well system and associated method which can embody principles of this disclosure.

Representatively illustrated in FIG. 1 is a system 10 for use with a subterranean well, and an associated method, which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the system 10 as depicted in FIG. 1, a tubular string 12 is deployed into a wellbore 14 lined with casing 16 and cement 18. The wellbore 14 in this example is generally vertical, but in other examples the wellbore could be horizontal, deviated or otherwise inclined relative to vertical. It is not necessary for the wellbore 14 to be cased or cemented in sections of the wellbore where the method is practiced.

The tubular string 12 in this example comprises coiled tubing, but in other examples the tubular string could be made up of separate tubing joints connected together by threaded connections, or other types of connections. The scope of this disclosure is not limited to use of any particular type of tubular string, tubing or other well equipment.

The tubing is "coiled" in that it is stored at surface on a spool or reel 20. An injector 22 and a blowout preventer stack 24 connected to a wellhead 26 may be used to convey the tubular string 12 into and out of the wellbore 14. A pump 28 may be used to apply pressure to an interior flow passage of the tubular string 12.

An annulus 30 is formed radially between the tubular string 12 and the casing 16 in the FIG. 1 example. In some situations, the annulus 30 can serve as a fluid passage for flowing fluid from the wellbore 14 to surface, for example, in drilling operations or other operations in which fluid is flowed into the wellbore via the tubular string 12.

The tubular string 12 in this example includes a combination of well tools 34, 36, 38, 40 connected together at a distal end of the tubular string. Typically, such a combination of well tools is referred to by those skilled in the art as a bottom hole assembly (BHA). However, it is not necessary for a combination of well tools incorporating the principles of this disclosure to be at or near a bottom of a hole or wellbore, or for any particular combination of well tools to be used, or for the well tools to be connected at a distal end of the tubular string. Thus, the scope of this disclosure is not limited at all to any of the details of the tubular string 12 or well tools 34, 36, 38, 40 as described herein or depicted in the drawings.

In the FIG. 1 example, the well tool 40 comprises a rotary actuator assembly with a fluid motor that produces rotation in response to fluid flow through the tubular string 12. Fluid can be pumped through an inner flow passage of the tubular string 12 (for example, using the pump 28), and through the rotary actuator assembly 40, in order to cause rotation of the well tools 34, 36 connected below the rotary actuator assembly. The well tool 38 could comprise an anchor or another type of anti-rotation device that functions to prevent reactive rotation or torque from being induced in the tubular string 12 above the rotary actuator assembly 40.

The fluid motor of the rotary actuator assembly 40 may be any type of fluid motor. For example, the fluid motor could be a positive displacement-type fluid motor, such as a Moineau progressive cavity pump. The scope of this disclosure is not limited to any particular type of fluid motor used in the rotary actuator assembly 40.

The well tools 34, 36 may be any type, number or combination of well tools. The well tools 34, 36 could include washing or other cleaning tools, drill bits, survey or logging equipment, perforating equipment, etc. In some examples, only a single well tool may be connected below the rotary actuator assembly 40. The scope of this disclosure is not limited to any particular well tool or well tools rotated by means of the rotary actuator assembly 40.

Figure 2:
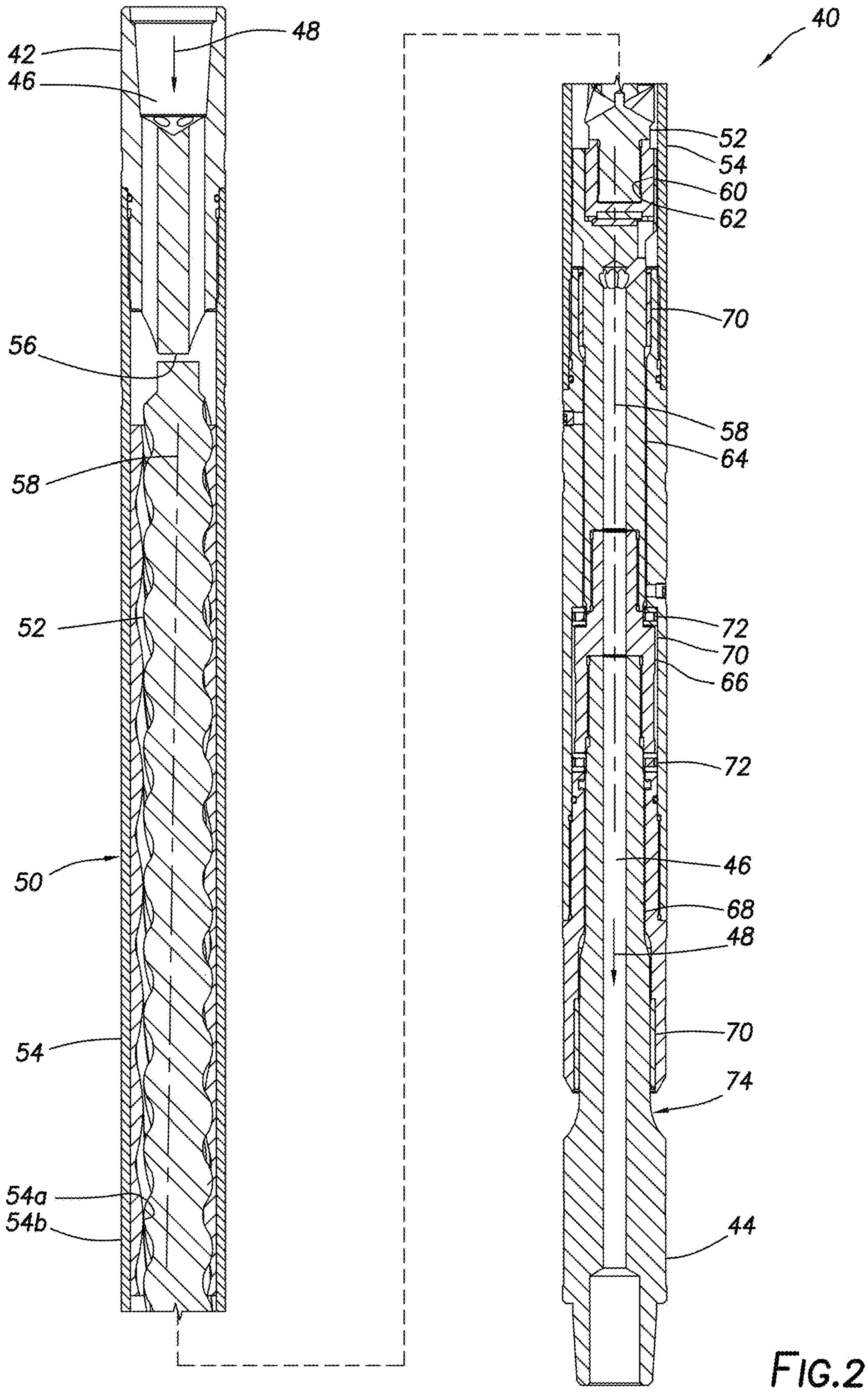
FIG. 2 is a representative cross-sectional view of a rotary actuator assembly that may be used in the system and method of FIG. 1, and which may embody the principles of this disclosure.

Referring additionally now to FIG. 2, a cross-sectional view of an example of the rotary actuator assembly 40 is representatively illustrated. In this example, the assembly 40 includes upper and lower connectors 42, 44 for connecting the assembly in the tubular string 12. However, the assembly 40 may be used in other tubular strings and in systems other than the system 10 of FIG. 1, in keeping with the principles of this disclosure.

When connected in the tubular string 12, the internal flow passage 46 of the tubular string extends longitudinally through the assembly 40. In this manner, a fluid 48 can be flowed through the flow passage 46 (such as, using the pump 28).

The assembly 40 includes a fluid motor 50 that produces rotation in response to the flow of the fluid 48 through the passage 46. In the FIG. 2 example, the fluid motor 50 is of the Moineau progressive cavity positive displacement-type, but other types of fluid motors may be used in other examples.

The fluid motor 50 includes a helically lobed rotor 52 positioned in an external stator 54. The stator 54 in this example has internal helical lobes formed in an elastomeric lining 54*a* secured in an outer tubular housing 54*b*.

In some examples, the fluid motor 50 lining 54*a* could be made of other types of materials, and the lining and the outer housing 54*b* are not necessarily separate components of the stator 54. For example, the lining 54*a* could be made of a metallic material or metal alloy, and/or the lining and housing 54*b* could be integrally formed as a single component. Thus, the scope of this disclosure is not limited to any particular details of the fluid motor 50 as described herein or depicted in the drawings.

The upper connector 42 has a downwardly extending (as viewed in FIG. 2) abutment 56 that prevents substantial upward displacement of the rotor 52. The rotor 52 is thereby maintained in operative engagement with the stator 54, so that the rotor rotates when the fluid 48 is flowed through the fluid motor 50.

Note that the rotor 52 also orbits relative to a central longitudinal axis 58 of the stator 54 with a displacement characterized by hypocyclic precessional motion, as is typical in Moineau-type fluid motors. As depicted in FIG. 2, the rotor 52 is off-center with respect to the longitudinal axis 58.

An externally toothed input gear 60 is rigidly connected at a bottom end of the rotor 52 during operation of the fluid motor 50. The gear 60 is rigidly connected to the rotor 52 in that no relative movement is permitted between the gear and the rotor. The gear 60 rotates with the rotor 52 and displaces with the same hypocyclic precessional motion as the rotor relative to the longitudinal axis 58. Although the gear 60 is depicted in FIG. 2 as being a separate component from the rotor 52, in other examples the gear and the rotor could be integrally formed as a single component.

The gear 60 is in engagement with an internally toothed output gear 62 formed in an upper end of a tubular shaft 64. Although the gear 62 and shaft 64 are depicted in FIG. 2 as being formed as a single component, they could in other examples be formed as separate rigidly connected components.

Note that the gear 62 and shaft 64 do not displace with the hypocyclic precessional motion of the rotor 52 and gear 60, but the gear 62 and shaft 64 do rotate about the longitudinal axis 58. However, the gear 62 and shaft 64 rotate at a slower rotational speed about the axis 58, as compared to the rotor 52 and gear 60, as described more fully below.

Rotation is transmitted from the shaft 64 to the lower connector 44 via additional tubular shafts 66, 68. The shafts 64, 66, 68 are supported by radial bearings 70 and thrust bearings 72. In other examples, all or some of the shafts 64, 66, 68 could be combined into an output shaft 74, which could comprise the multiple shafts 64, 66, 68 or a single integrally formed shaft.

Due to the unique arrangement of the gears 60, 62 in relation to the rotor 52 and output shaft 74, the lower connector 44 rotates at a slower rotational speed than the rotor 52. Thus, the gears 60, 62 provide for a "gear reduction" (an increased gear ratio) in the assembly 40. This reduced rotational speed of the lower connector 44 can be very beneficial in a variety of different well operations.

Figure 3:
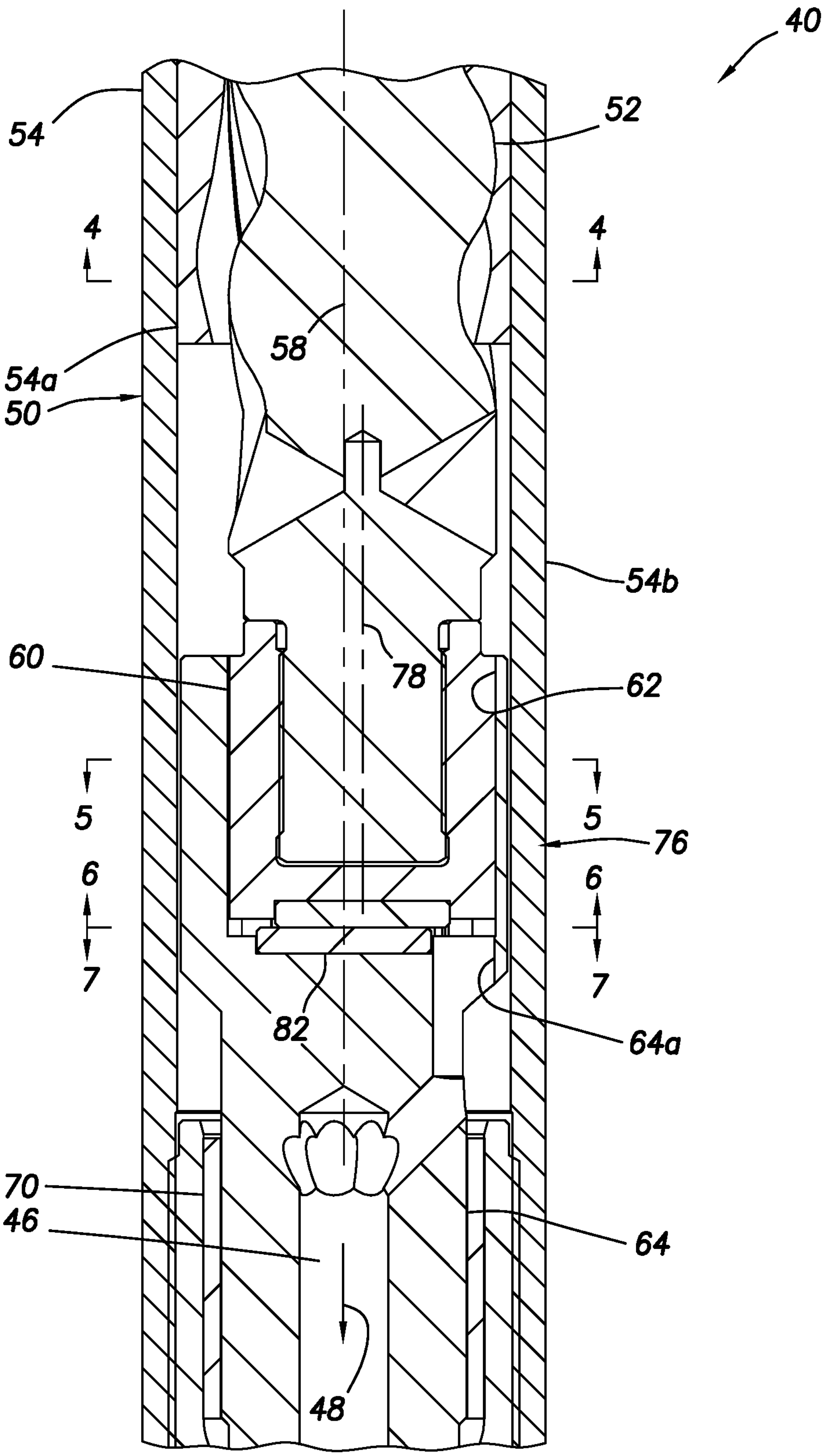
FIG. 3 is a representative cross-sectional view of a gear reducer section of the rotary actuator assembly.
Figure 4:
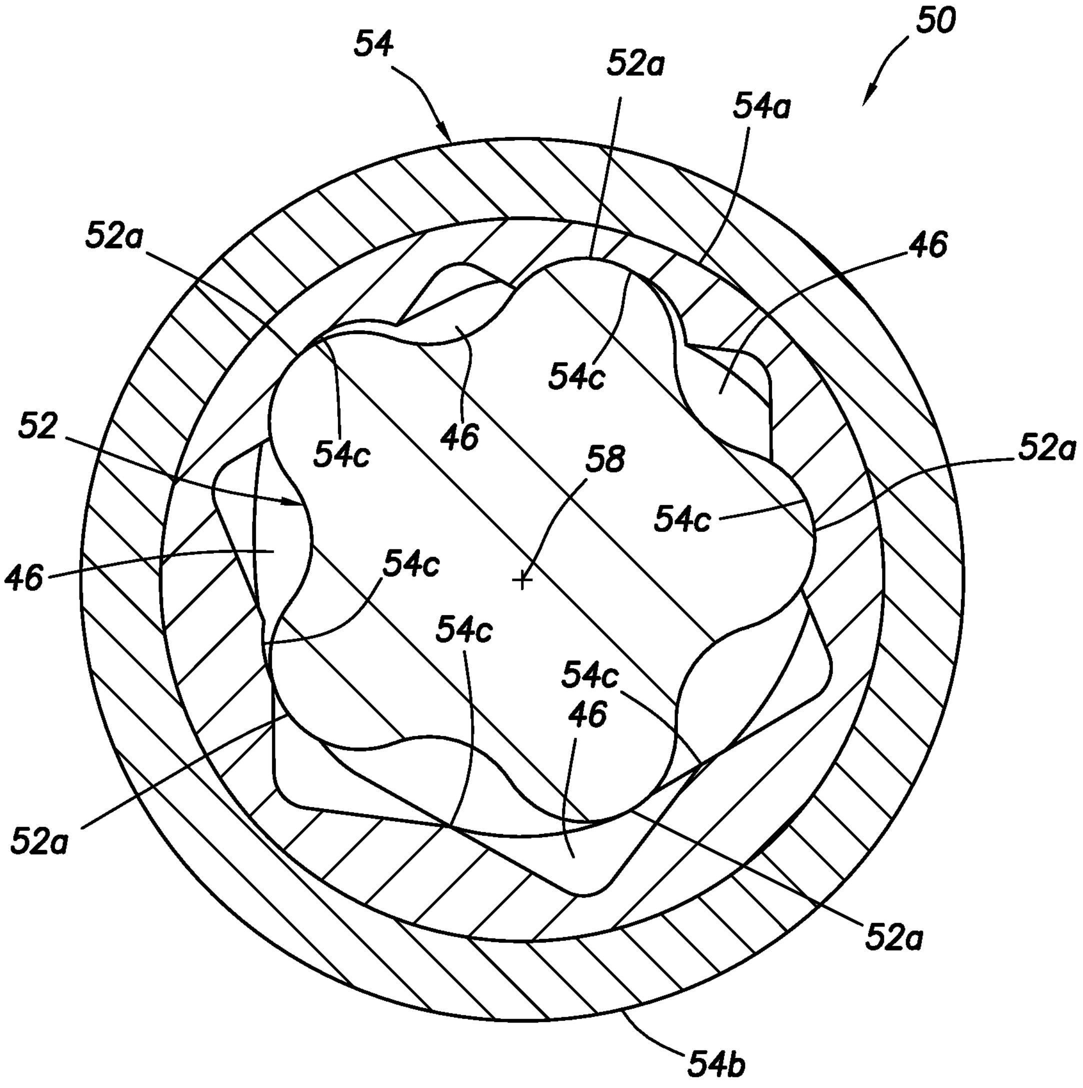
FIG. 4 is a representative cross-sectional view of a fluid motor of the rotary actuator assembly, taken along line 4-4 of FIG. 3.
Figure 5:
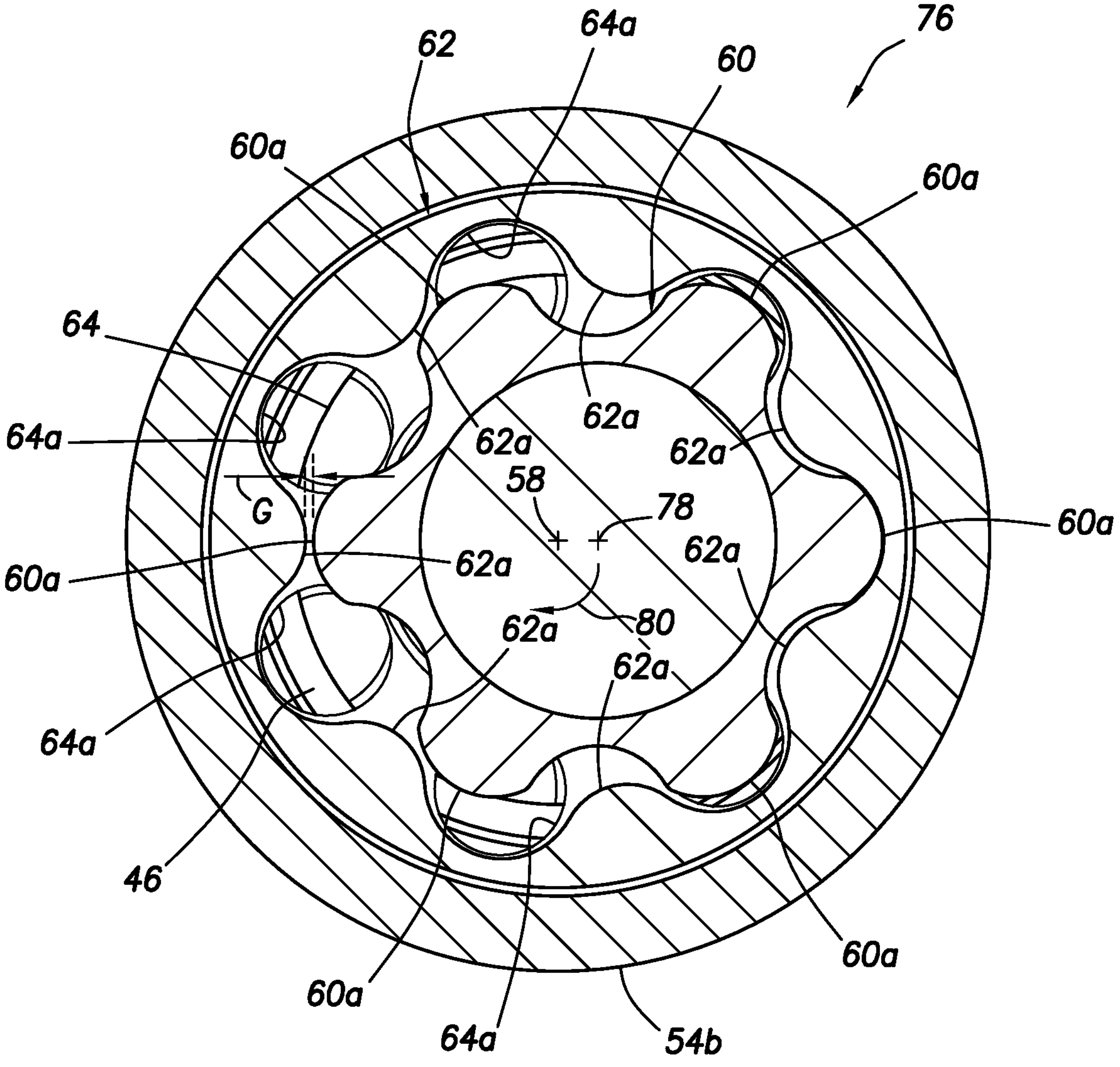
FIG. 5 is a representative cross-sectional view of the gear reducer section, taken along line 5-5 of FIG. 3.
Figure 6:
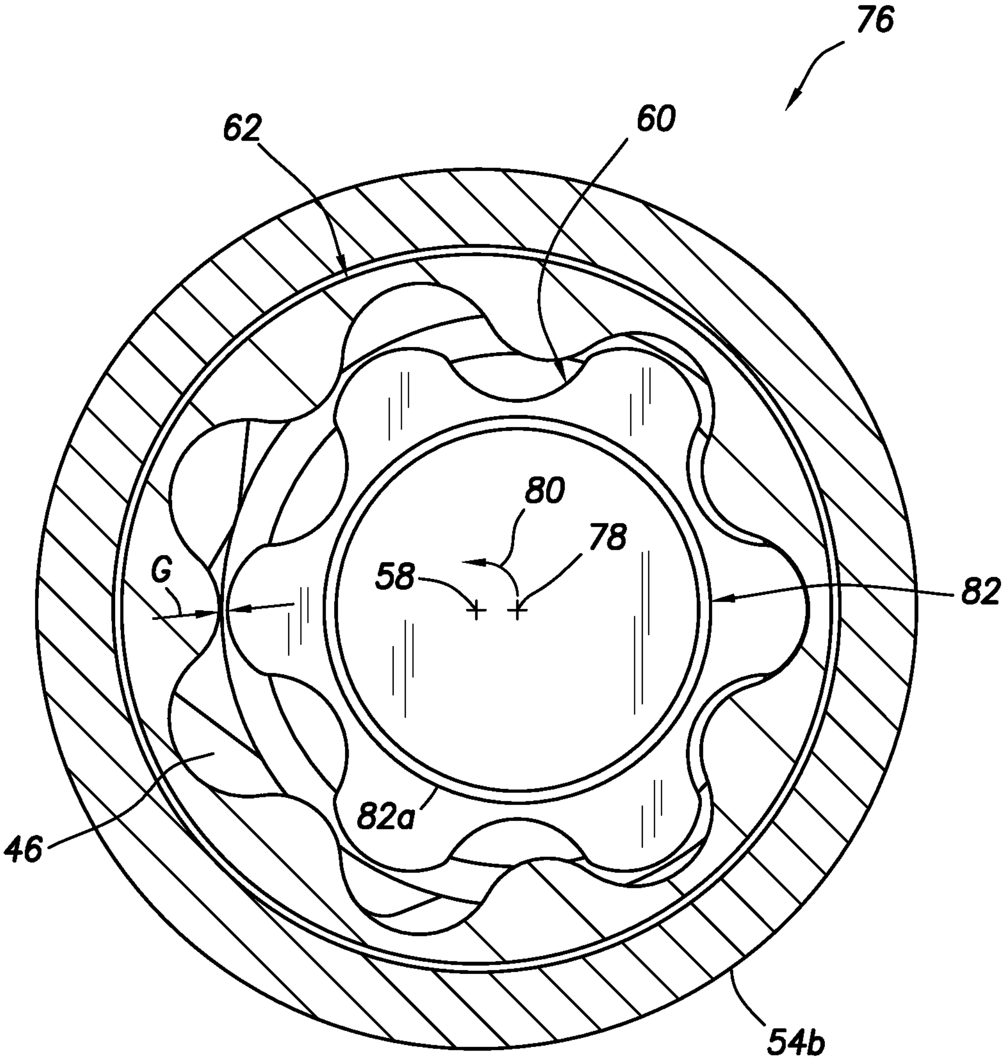
FIG. 6 is a representative cross-sectional view of the gear reducer section, taken along line 6-6 of FIG. 3.
Figure 7:
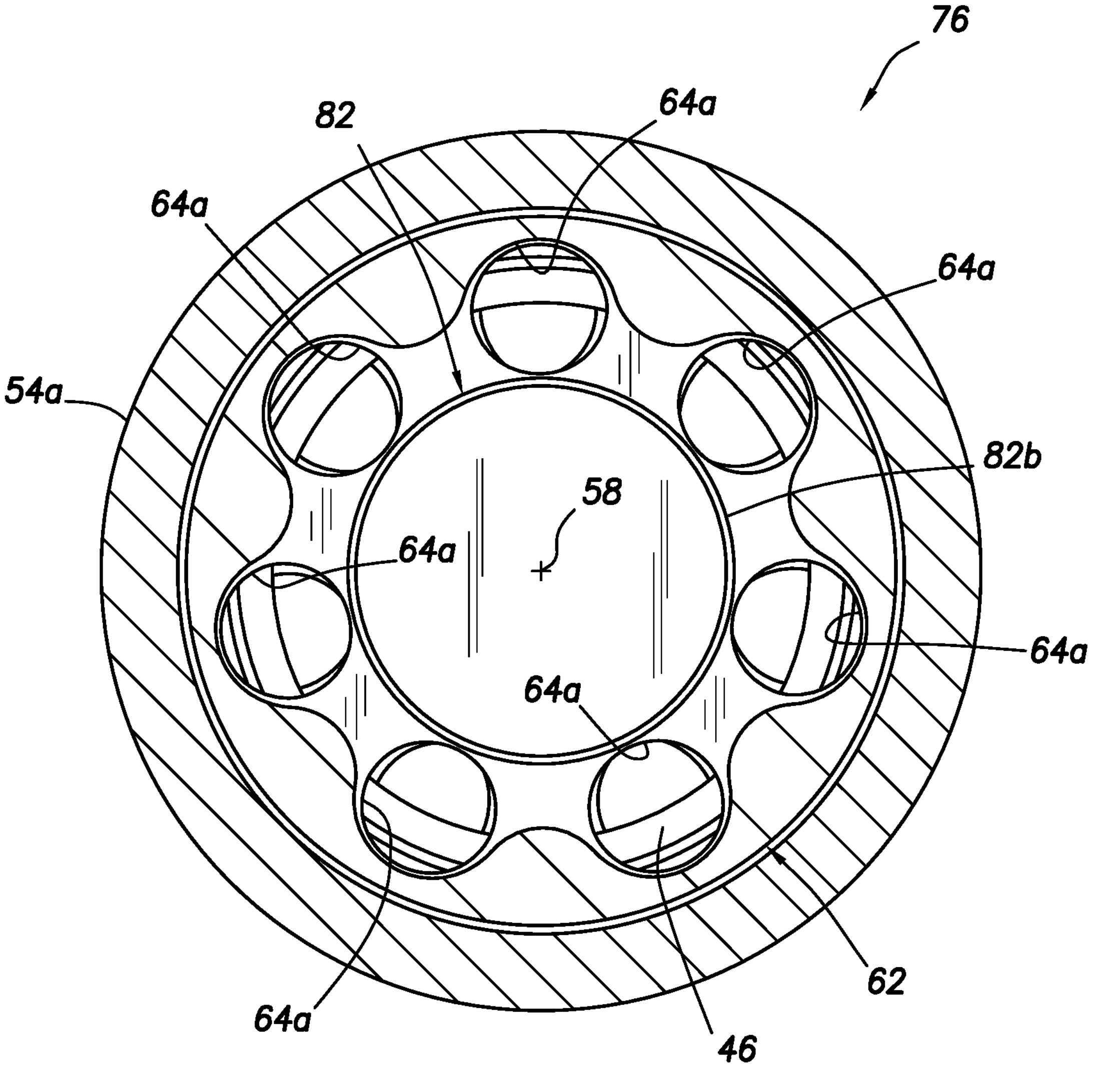
FIG. 7 is a representative cross-sectional view of the gear reducer section, taken along line 7-7 of FIG. 3.

Referring additionally now to FIG. 3, an enlarged scale cross-sectional view of a gear reducer section 76 of the rotary actuator assembly 40 is representatively illustrated. FIGS. 5, 6 & 7 are representative cross-sectional views of the gear reducer section 76, taken along lines 5-5, 6-6 and 7-7 of FIG. 3, respectively. FIG. 4 is a representative cross-sectional view of the fluid motor 50, taken along line 4-4 of FIG. 3.

In FIG. 4, it may be seen that the rotor 52 in this example is provided with five external lobes 52*a*, and the stator 54 is provided with six internal lobes 54*c* (some of which are compressed by the rotor lobes 52*a* as viewed in FIG. 4). In Moineau-type fluid motors, the numbers of lobes on the rotor and the stator are unequal, and a ratio of the numbers of lobes influences a rotational speed of the rotor at a given flow rate. Any numbers of external and internal lobes 52*a*, 54*c* may be provided on the rotor 52 and stator 54, respectively, in keeping with the scope of this disclosure.

In FIG. 5, it may be seen that the gear 60 in this example is provided with six external teeth 60*a*, and the gear 62 is provided with seven internal teeth 62*a*. Different numbers of the teeth 60*a*, 62*a* may be used in other examples.

As mentioned above, the gear 60 rotates and precesses with the rotor 52. As a result, a central axis 78 of the gear 60 rotates about the longitudinal axis 58 (as indicated by the arrow 80 in FIG. 5). Thus, the gear 60 rotates about its central axis 78, and the axis 78 rotates about the longitudinal axis 58 when the rotor 52 rotates within the stator 54. Note that the central axis 78 is also a central longitudinal axis of the rotor 52 in this example (see FIG. 3).

Due to this unique configuration and motion of the gear 60, the cooperative arrangement of the engaged gears 60, 62 and the numbers of the teeth 60*a*, 62*a*, the gear 62 will rotate at a slower rotational speed as compared to the gear 60. The gear reduction ratio can be calculated using the following equation: $R=1-(N_I/N_O)$, in which R is the gear ratio, $N_I$ is the number of input gear teeth 60*a*, and $N_O$ is the number of output gear teeth 62*a*.

Using the present example ($N_I=6$ and $N_O=7$), the gear ratio R is ~0.14. Thus, the gear 62, output shaft 74 and lower connector 44 (and any well tool connected thereto) will rotate at a speed that is approximately 0.14 times the rotational speed of the rotor 52. Of course, other gear ratios may be used in other examples.

Relatively large voids exist between the gears 60, 62, so that the flow passage 46 extends through those gaps. In addition, the shaft 64 has openings 64*a* formed therein for flow of the fluid 48, so that the openings 64*a* form part of the passage 46.

Note that only a relatively small gap G exists between disengaged pairs of the teeth 60*a*, 62*a*. This prevents disengagement of the engaged teeth 60*a*, 62*a* opposite the gap G from the axis 78. Thus, at least one pair of the teeth 60*a*, 62*a* is positively engaged at all times, so that rotation and torque are consistently transmitted from the input gear 60 to the output gear 62.

In FIG. 6, it may be seen that an upper portion of a thrust bearing 82 (also see FIG. 3) is provided in the form of a flat disc 82*a* secured at a lower end of the gear 60. The disc 82*a* is made of a polished carbide material in this example, but other materials and other types of thrust bearings may be used in other examples.

In FIG. 7, it may be seen that a lower portion of the thrust bearing 82 is provided in the form of a flat disc 82*b* secured at an upper end of the shaft 64. The disc 82*b* is made of a polished carbide material in this example, similar to the disc 82*a*, but other materials and other types of thrust bearings may be used in other examples.

Figure 8:
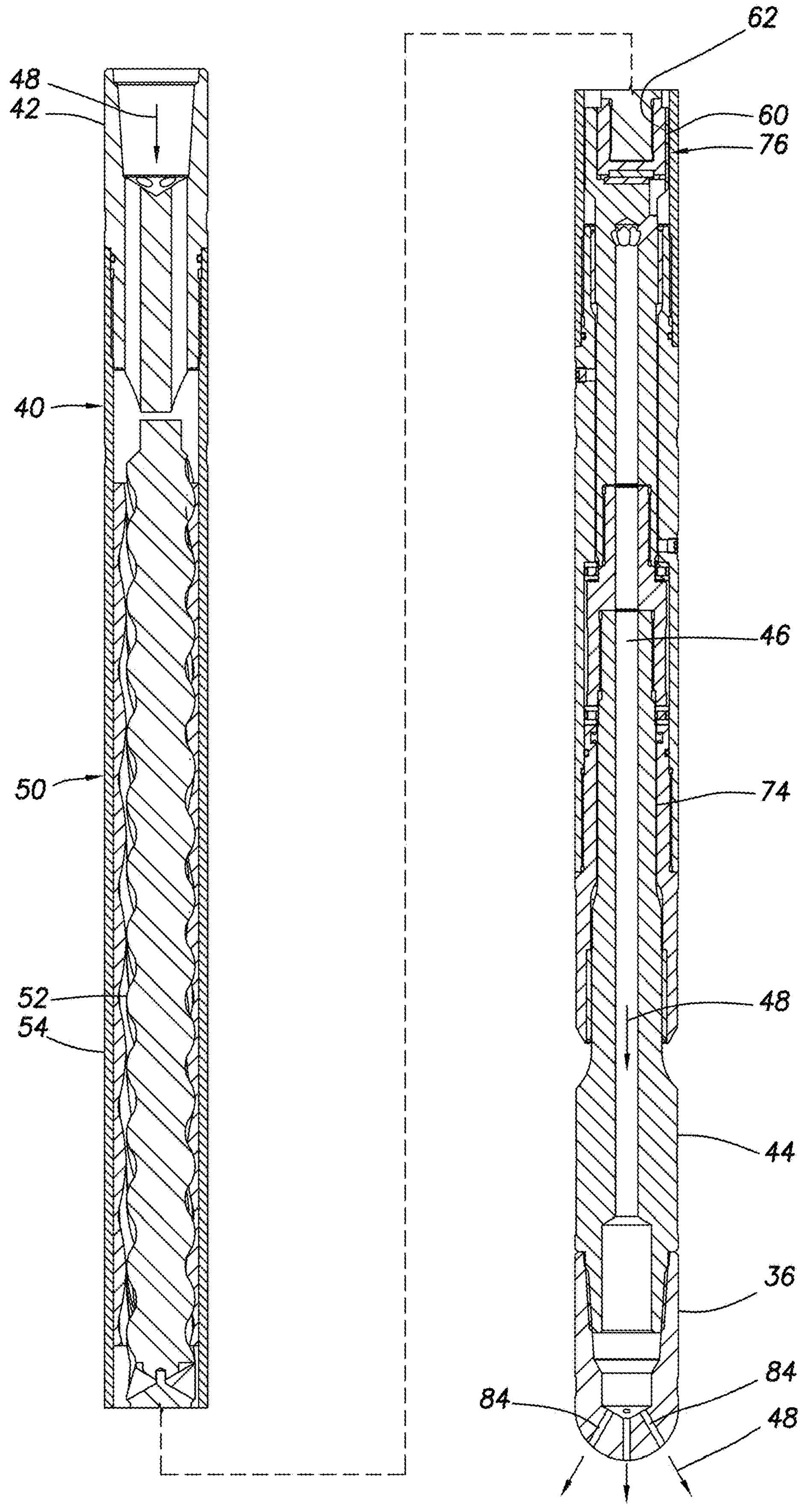
FIG. 8 is a representative cross-sectional view of an example of a bottom hole assembly comprising the rotary actuator assembly connected to a cleaning tool.

Referring additionally now to FIG. 8, an example use of the rotary actuator assembly 40 is representatively illustrated. In this example, the well tool 36 is connected to the lower connector 44. The well tool 36 comprises a wash tool with nozzles 84 for increasing a velocity of the fluid 48 flow and directing the flow outward, for example, to clean an interior of the casing 16 in the FIG. 1 system. Other types of washing or cleaning tools (such as casing scrapers, etc.) may be used in other examples.

It is desirable for the wash tool 36 to be rotated relatively slowly by the rotary actuator assembly 40 (in any event, slower than the rotor 52 rotates in response to the fluid 48 flow), so that the fluid 48 impinges longer on a given surface area to be cleaned. For at least this purpose, the gear reducer section 76 reduces the rotational speed of the lower connector 44 and the connected wash tool 36.

Figure 9A:
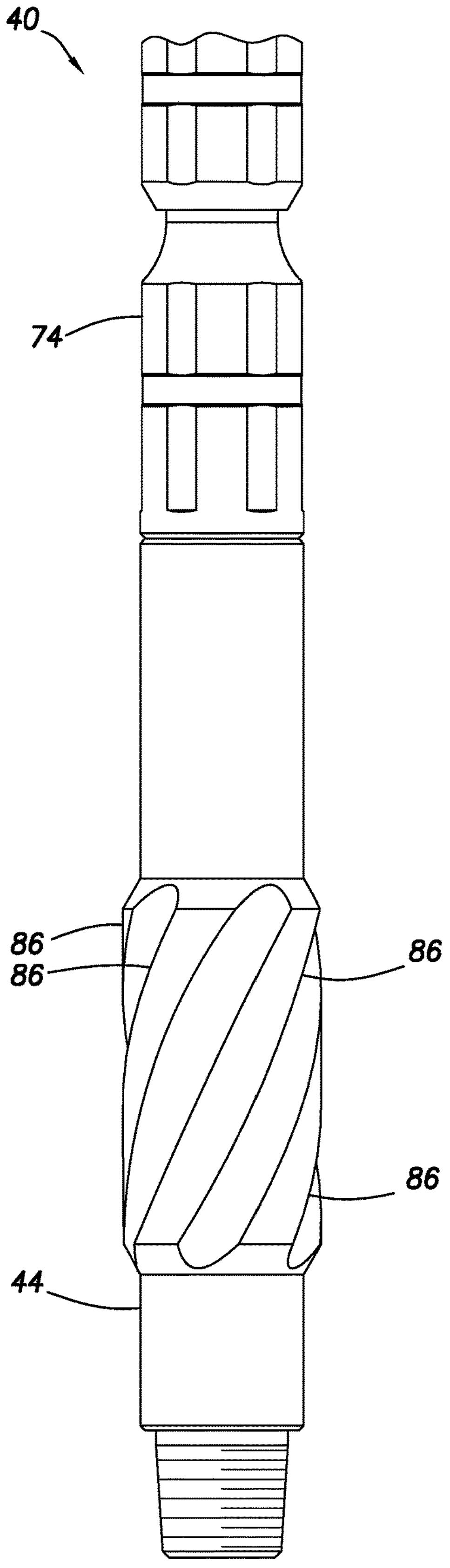
FIGS. 9A & B are representative side and cross-sectional views of an example of a lower section of the rotary actuator assembly.
Figure 9B:
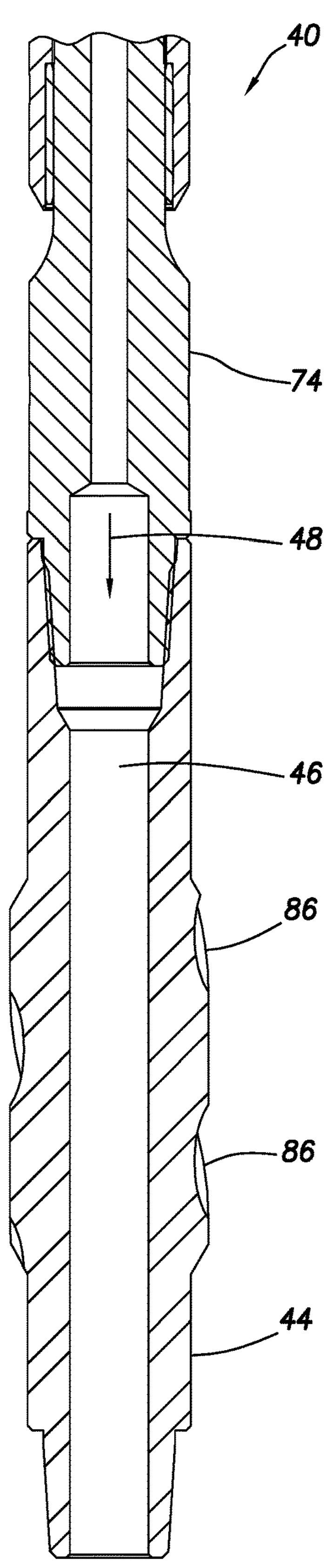

Referring additionally now to FIGS. 9A & B, side and cross-sectional views, respectively, of a lower section of another example of the assembly 40 are representatively illustrated. In these views, it may be seen that the output shaft 74 is separately formed from the lower connector 44, and a series of external helical threads 86 are formed on the lower connector.

The threads 86 are oriented so that, as the lower connector 44 rotates in response to flow of the fluid 48 through the passage 46, the threads urge the assembly 40 to advance through the wellbore 14 in the system 10 of FIG. 1. For example, the threads 86 could engage an interior surface of the casing 16 (or an inner wall of the wellbore 14 itself if the wellbore is uncased) and thereby "pull" the assembly 40 along the surface as the lower connector 44 rotates.

The threads 86 can extend radially outward past the remainder of the assembly 40, so that the threads positively engage the well surface (e.g., the interior surface of the casing 16 or an inner wall surface of the wellbore 14). In this example, the threads 86 operate to "screw" the assembly 40 into the wellbore 14.

Figure 10A:
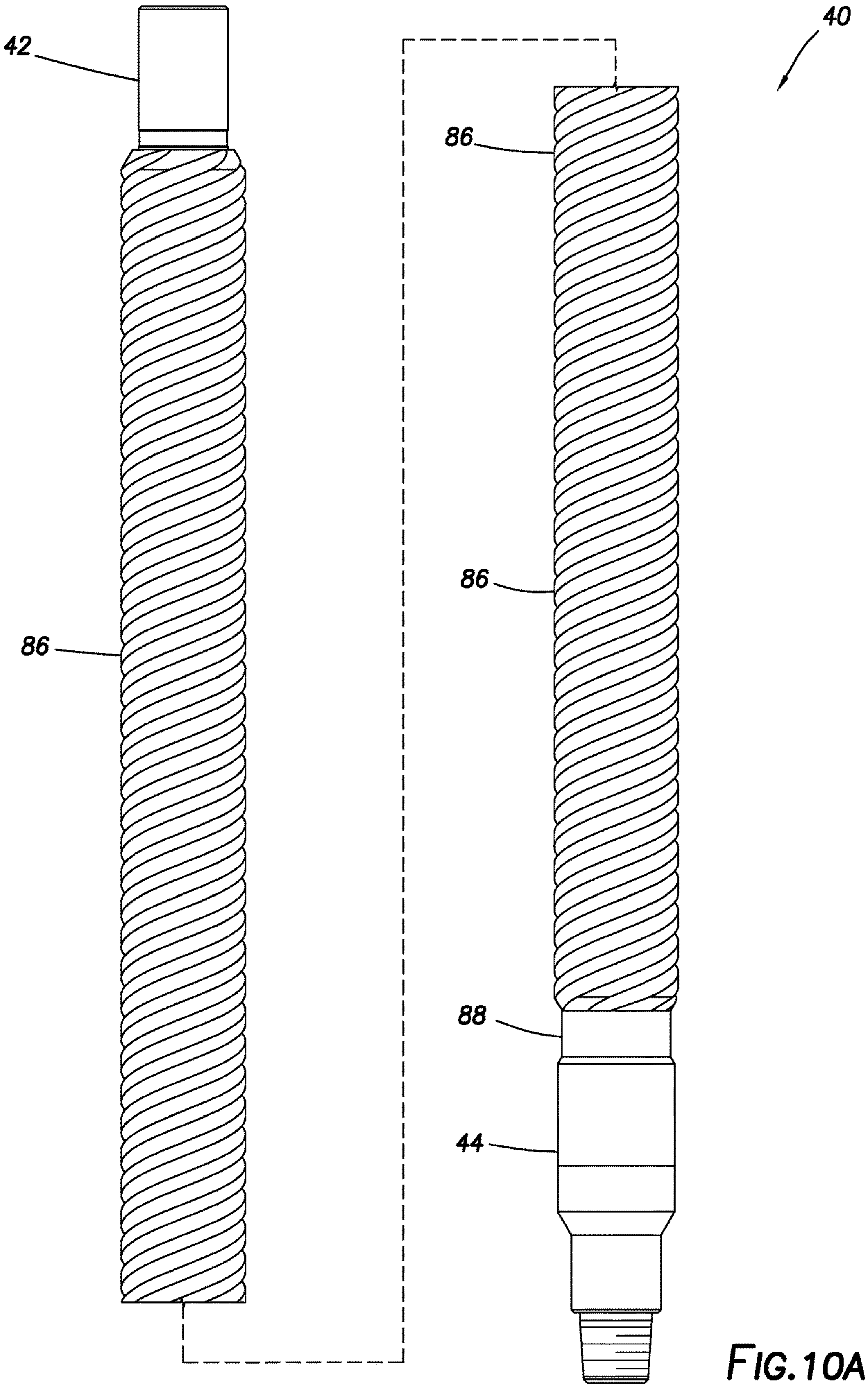
FIGS. 10A & B are representative side and cross-sectional views of an example of a tractor embodiment of the rotary actuator assembly.
Figure 10B:
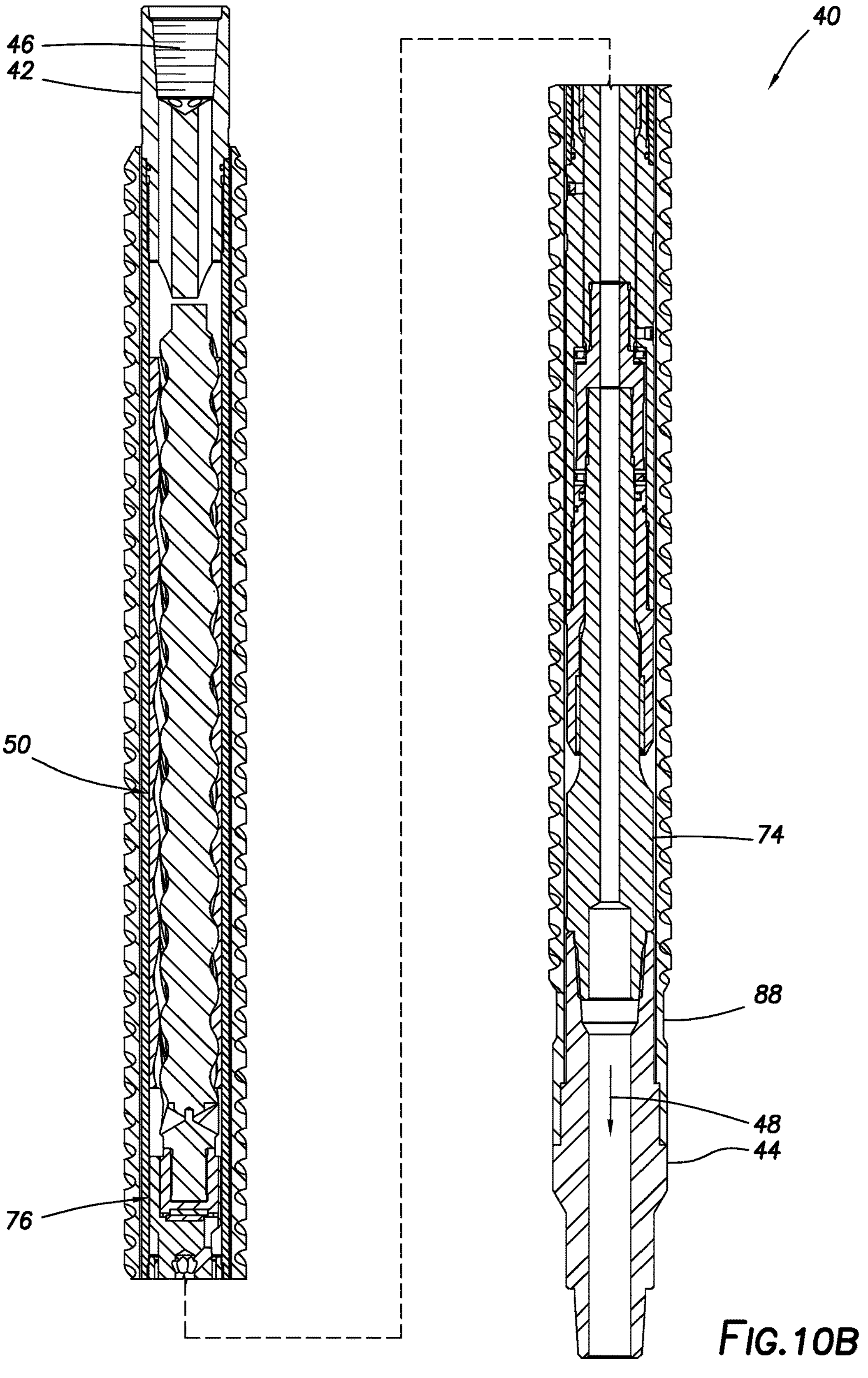

Referring additionally now to FIGS. 10A & 10B, side and cross-sectional views, respectively, of another example of the assembly 40 are representatively illustrated. In this example, the threads 86 are not formed directly on the lower connector 44, but are instead formed on a separate outer sleeve 88 that is connected to the lower connector and extends upwardly over an exterior of the fluid motor 50 and gear reducer section 76.

As described above for the FIGS. 9A & B example, the configuration of FIGS. 10A & B can be used to urge the assembly 40 and the remainder of the tubular string 12 through the wellbore 14 in the FIG. 1 system 10 in response to flow of the fluid 48 through the passage 46. In this manner, the assembly 40 can function as a "tractor" to advance any connected equipment and tubulars through the wellbore 14, whether or not the wellbore is lined with the casing 16 and cement 18.

Figure 11A:
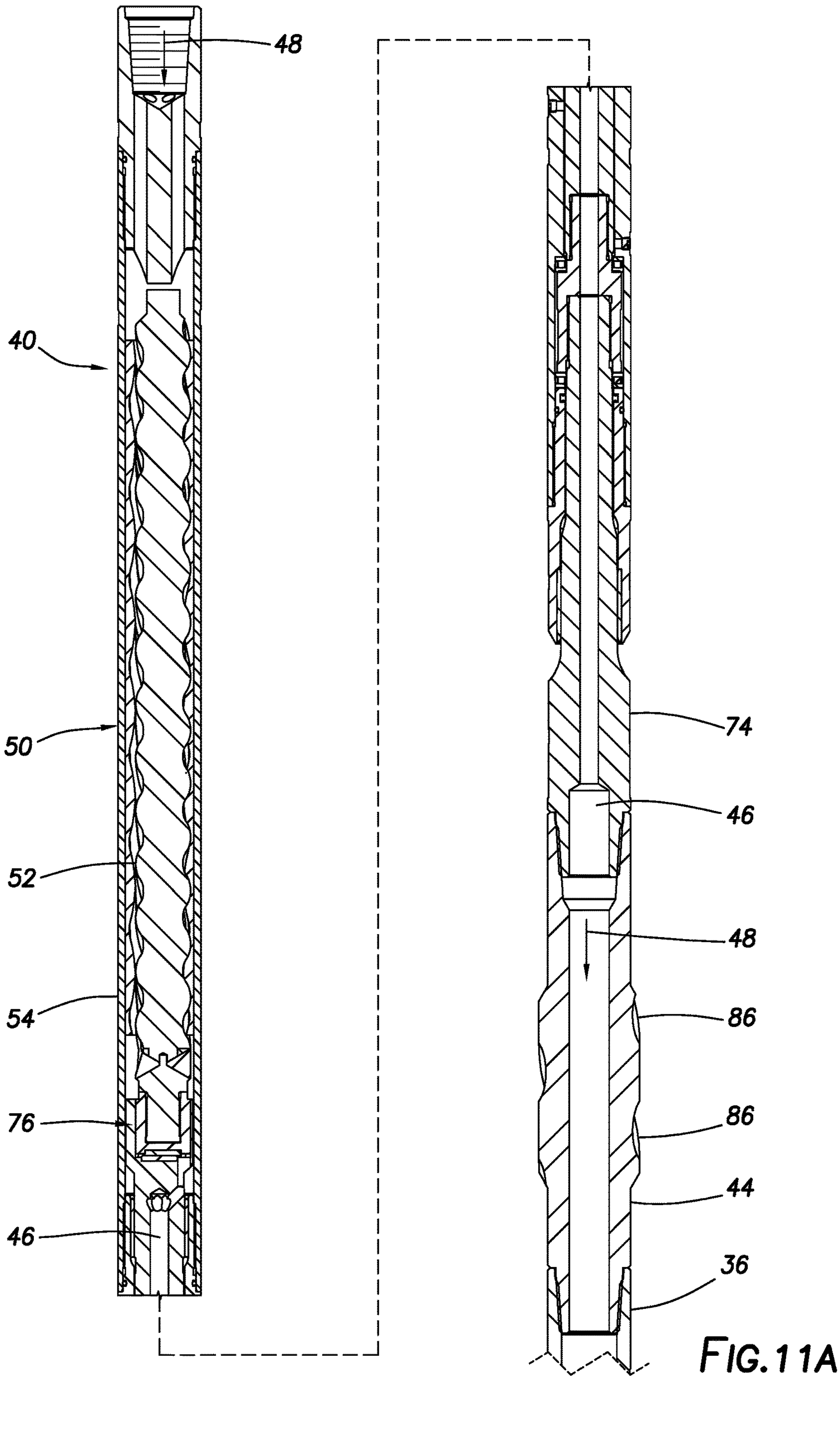
FIGS. 11A & B are representative cross-sectional views of an example of a bottom hole assembly comprising the rotary actuator assembly connected to a fluid motor and a drill bit.

Referring additionally now to FIGS. 11A & B, another example of the assembly 40 connected to well tools 34, 36 is representatively illustrated. In this example, the well tool 36 comprises a fluid motor. The fluid motor 36 may be similar to the fluid motor 50, or it may be a different type of fluid motor. The fluid motor 36 in this example does not have a gear reducer section that receives an output of a rotor 90 of the fluid motor 36, but a gear reducer section could be provided, if desired.

Figure 11B:
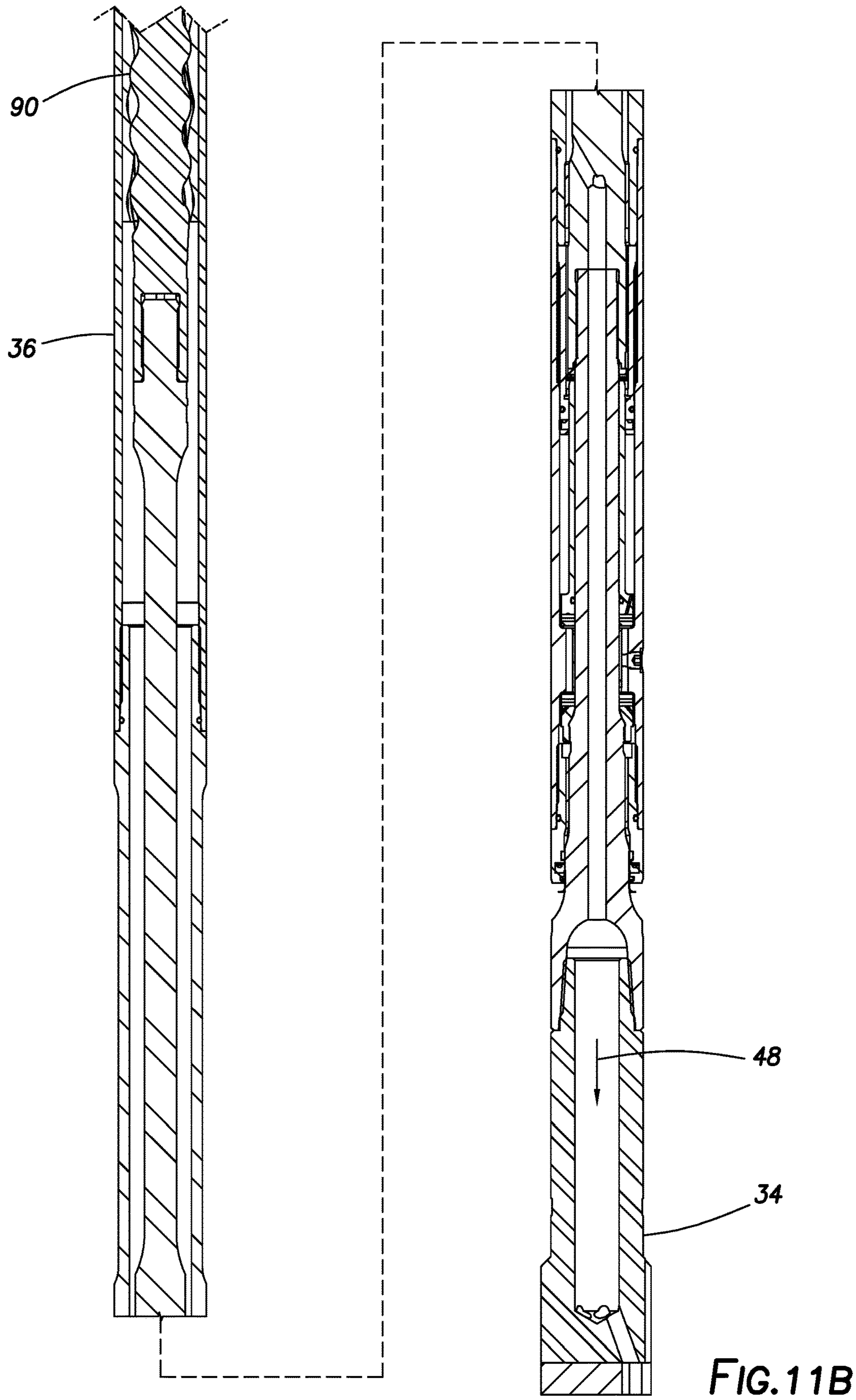

The well tool 34 comprises a drill bit as depicted in FIG. 11B. The drill bit 34 may be used to extend the wellbore 14 in the FIG. 1 system 10, or it may be used for other purposes (for example, to initiate or start a lateral wellbore or side-track, or drill through a bridge plug). Other types of cutting devices (such as mills, etc.) may be used for the well tool 34 in other examples.

The fluid motor 36 rotates the drill bit 34 relatively rapidly in this example, in order to correspondingly rapidly drill the wellbore 14. Thus, the fluid motor 36 does not include the gear reducer section 76.

The assembly 40 is used to slowly rotate the fluid motor 36 and drill bit 34, in order to prevent sticking (e.g., stiction, static friction or differential sticking) of these components against the interior wall of the wellbore 14. The assembly 40 also rotates the lower connector 44 with the threads 86 thereon to help advance the tubular string 12 along the wellbore 14. This is particularly beneficial in horizontal or highly deviated wellbores. The threads 86, and the rotation of the fluid motor 36 with the drill bit 34, also help to clear drill cuttings and debris from around the bottom hole assembly.

Note that, with both of the fluid motors 36, 50 connected above the drill bit 34, the drill bit will rotate at a speed that is a sum of the rotational speed output of the fluid motor 36 and the rotational speed output of the fluid motor 50. One benefit of providing the gear reducer section 76 in the assembly 40 is that it prevents rotating the drill bit 34 too fast. However, the assembly 40 could be provided without the gear reducer section 76, if desired.

It may now be fully appreciated that the above disclosure provides significant advancements to the arts of designing, constructing and utilizing equipment to produce rotation of well tools downhole. In examples described above, the gear reducer section 76 efficiently transmits rotation and torque from the fluid motor 50 to the output shaft 74, lower connector 44 and any well tools 34, 36 connected thereto, and does so with a minimum number of moving components, thereby enhancing a reliability of the rotary actuator assembly 40.

The above disclosure provides to the art a rotary actuator assembly 40 for use in a subterranean well. In one example, the rotary actuator assembly 40 can comprise a fluid motor 50 including a rotor 52 that displaces with hypocyclic precessional motion within a stator 54 in response to fluid 48 flow through the fluid motor 50, and a gear reducer section 76 including an input gear 60 that is fixed relative to the rotor 52 and displaces with the hypocyclic precessional motion relative to an output gear 62.

The input gear 60 may orbit with the rotor 52 about a central longitudinal axis 58 of the stator 54. The input gear 60 may rotate about a central axis 78 of the input gear 60. The central axis 78 of the input gear 60 may rotate about a central longitudinal axis 58 of the stator 54.

A gap G between disengaged teeth 60*a*, 62*a* of the input and output gears 60, 62 may be too small to permit disengagement of engaged teeth 60*a*, 62*a* of the input and output gears 60, 62. The disengaged teeth 60*a*, 62*a* of the input and output gears 60, 62 may prevent disengagement of the engaged teeth 60, 62*a* of the input and output gears 60, 62.

The rotary actuator assembly 40 may include one or more external threads 86 rotated by the gear reducer section 76. The external threads 86 may rotate with the output gear 62. The external threads 86 may extend radially outward past an outer housing 54*a* of the stator 54.

The above disclosure also provides to the art a rotary actuator assembly 40 which, in one example, comprises a fluid motor 50 including a rotor 52 that rotates within a stator 54 in response to fluid 48 flow through the fluid motor 50, the rotor 52 having a central longitudinal axis 78 that rotates about a central longitudinal axis 58 of the stator 54, and a gear reducer section 76 including an input gear 60 that rotates with the rotor 52 and displaces relative to an output gear 62, and the input gear 60 having the same central longitudinal axis 78 as the rotor 52.

The input gear 60 may be fixed relative to the rotor 52. The input gear 60 may rotate about the central longitudinal axis 78 of the rotor 52. The output gear 62 may rotate about the central longitudinal axis 58 of the stator 54. The rotor 52 may displace with hypocyclic precessional motion relative to the stator 54, and the input gear 60 may displace with the same hypocyclic precessional motion relative to the output gear 62.

A method for use with a subterranean well is also described above. In one example, the method can comprise: flowing a fluid 48 through a flow passage 46 of a tubular string 12 in the well; and rotating an output shaft 74 of a rotary actuator assembly 40 in response to the fluid 48 flowing, the rotary actuator assembly 40 comprising a rotor 52 that rotates within a stator 54 in response to the fluid 48 flowing, the rotor 52 having a central longitudinal axis 78 that rotates about a central longitudinal axis 58 of the stator 54, and a gear reducer section 76 including an input gear 60 that is fixed relative to the rotor 52 and displaces relative to an output gear 62, the input gear 60 and the rotor 52 having the same central longitudinal axis 78.

The output shaft 74 rotating step may include the input gear 60 rotating about the central longitudinal axis 78 of the rotor 52. The output shaft 74 rotating step may include the output gear 62 rotating about the central longitudinal axis 58 of the stator 54. The output shaft 74 rotating step may include the rotor 52 displacing with hypocyclic precessional motion relative to the stator 54, and the input gear 60 displacing with the same hypocyclic precessional motion relative to the output gear 62.

The output shaft 74 rotating step may include a gap G between disengaged teeth 60*a*, 62*a* of the input and output gears 60, 62 being too small to permit disengagement of engaged teeth 60*a*, 62*a* of the input and output gears 60, 62. The output shaft 74 rotating step may include disengaged teeth 60*a*, 62*a* of the input and output gears 60, 62 preventing disengagement of engaged teeth 60*a*, 62*a* of the input and output gears 60, 62.

The output shaft 74 rotating step may include rotating a fluid motor 36 connected to the output shaft 74. The step of rotating the fluid motor 36 may comprise rotating a drill bit 34 connected to the fluid motor 36. The method may further comprise connecting the fluid motor 36 in the tubular string 12 between the rotary actuator assembly 40 and the drill bit 34.

The output shaft 74 rotating step may include rotating one or more external threads 86. The external threads 86 may be in contact with a well surface (such as, an interior surface of the casing 16, an inner wall surface of the wellbore 14, etc.). The external threads 86 rotating step may include advancing the rotary actuator assembly 40 in the well (such as, along the wellbore 14 or through the casing 16).

A well system 10 for use with a subterranean well is also described above. In one example, the well system 10 can comprise: a first fluid motor 50, and a second fluid motor 36. Fluid 48 flow through the first fluid motor 50 causes rotation of the second fluid motor 36 in the well.

The first fluid motor 50 may be included in a rotary actuator assembly 40, and the rotary actuator assembly 40 may also include a gear reducer section 76. The first fluid motor 50 may comprise a rotor 52 that rotates within a stator 54 in response to the fluid 48 flow, the rotor 52 having a central longitudinal axis 78 that rotates about a central longitudinal axis 58 of the stator 54. The gear reducer section 76 may include an input gear 60 that is fixed relative to the rotor 52 and displaces relative to an output gear 62, the input gear 60 and the rotor 52 having the same central longitudinal axis 78.

The gear reducer section 76 may comprise an input gear 60 that rotates with the rotor 52 and displaces relative to an output gear 62, with the input gear 60 having the same central longitudinal axis 78 as the rotor 52. The first fluid motor 50 may comprise a rotor 52 that displaces with hypocyclic precessional motion within a stator 54 in response to the fluid 48 flow, and the gear reducer section 76 may comprise an input gear 60 that is fixed relative to the rotor 54 and displaces with the hypocyclic precessional motion relative to an output gear 62.

The well system 10 may include a cutting tool connected to the second fluid motor 36. The cutting tool may comprise a drill bit 34. The second fluid motor 36 may be connected between the cutting tool and the first fluid motor 36.

The well system 10 may include one or more external threads 86 rotated by the first fluid motor 50. The external threads 86 may rotate with the second fluid motor 36. The external threads 86 may extend radially outward past an outer housing 54*a* of the first fluid motor 50.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A method for use with a subterranean well, the method comprising:

flowing a fluid through a flow passage of a tubular string in the well; and rotating an output shaft of a rotary actuator assembly in response to the fluid flowing, the rotary actuator assembly comprising a rotor that rotates within a stator in response to the fluid flowing, the rotor having a central longitudinal axis that rotates about a central longitudinal axis of the stator, and a gear reducer section including an input gear that is fixed relative to the rotor and displaces relative to an output gear, the input gear and the rotor having the same central longitudinal axis, and in which the flow passage comprises at least one void formed between disengaged teeth of the input and output gears.

2. The method of claim 1, in which the output shaft rotating further comprises the input gear rotating about the central longitudinal axis of the rotor.

3. The method of claim 1, in which the output shaft rotating further comprises the output gear rotating about the central longitudinal axis of the stator.

4. The method of claim 1, in which the output shaft rotating further comprises the rotor displacing with hypocyclic precessional motion relative to the stator, and the input gear displacing with the same hypocyclic precessional motion relative to the output gear.

5. The method of claim 1, in which the output shaft rotating further comprises a gap between the disengaged teeth of the input and output gears being too small to permit disengagement of engaged teeth of the input and output gears.

6. The method of claim 1, in which the output shaft rotating further comprises the disengaged teeth of the input and output gears preventing disengagement of engaged teeth of the input and output gears.

7. The method of claim 1, in which the output shaft rotating further comprises rotating a fluid motor connected to the output shaft.

8. The method of claim 7, in which rotating the fluid motor comprises rotating a drill bit connected to the fluid motor.

9. The method of claim 8, further comprising connecting the fluid motor in the tubular string between the rotary actuator assembly and the drill bit.

10. The method of claim 1, in which the output shaft rotating comprises rotating one or more external threads.

11. The method of claim 10, in which the external threads are in contact with a well surface.

12. The method of claim 10, in which the external threads rotating comprises advancing the rotary actuator assembly in the well.

* * * * *